UNITED STATES PATENT OFFICE.

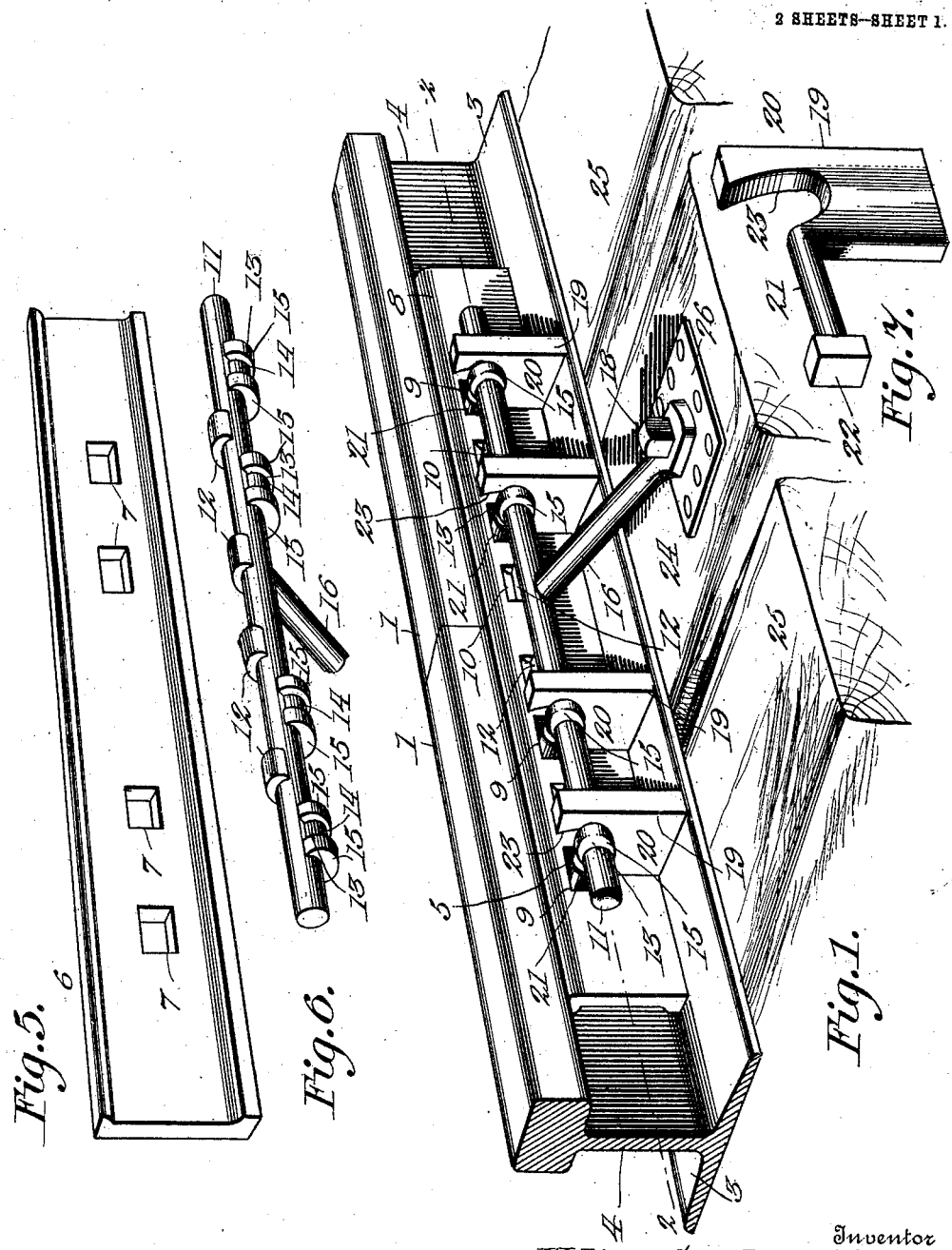

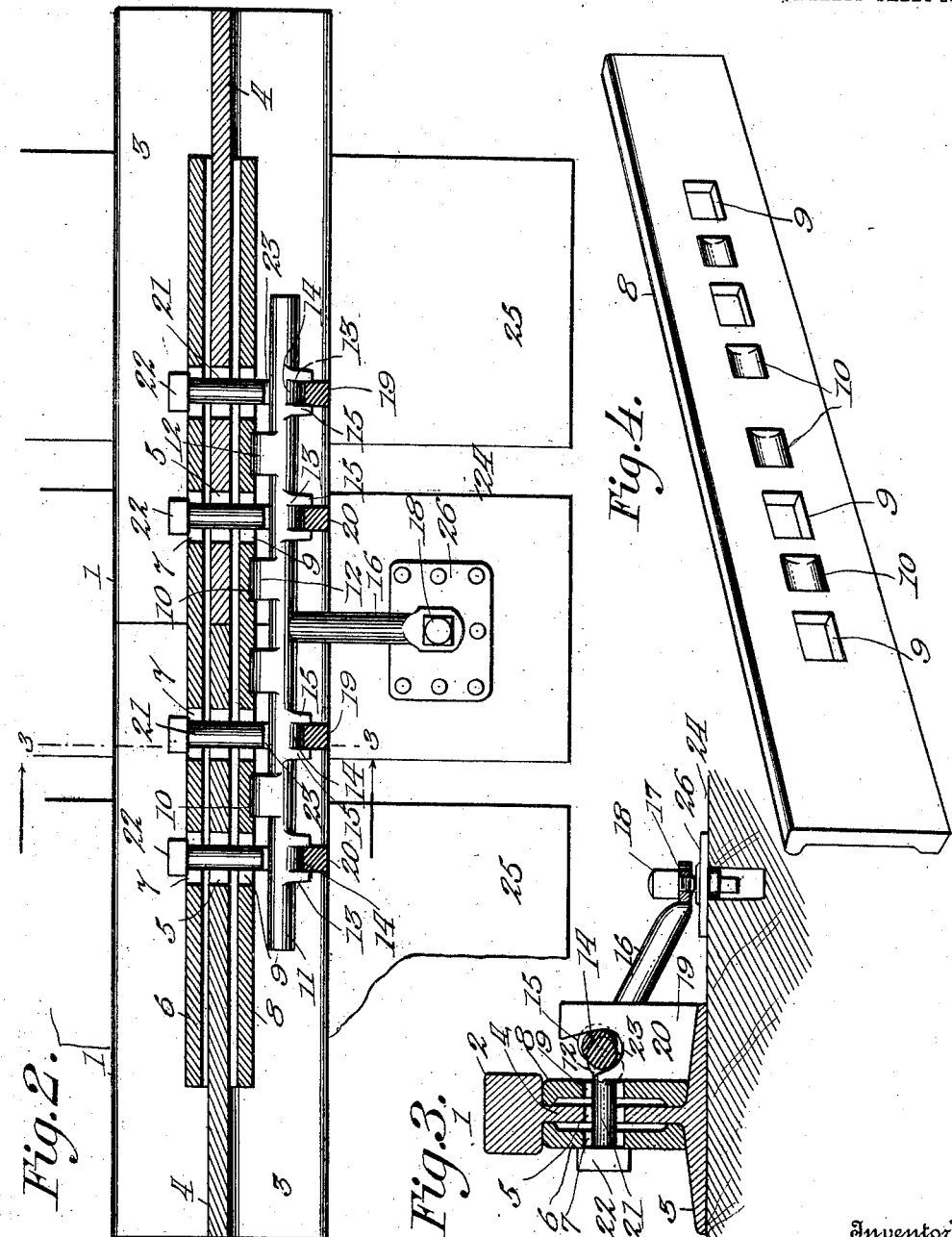

WALTER GRZYBOWSKI, OF GREEN BAY, WISCONSIN.

RAIL-JOINT.

990,729.

Specification of Letters Patent. Patented Apr. 25, 1911.

Application filed July 5, 1910. Serial No. 570,517.

*To all whom it may concern:*

Be it known that I, WALTER GRZYBOWSKI, a citizen of the United States, residing at Green Bay, in the county of Brown and State of Wisconsin, have invented new and useful Improvements in Rail-Joints, of which the following is a specification.

This invention relates to improvements in railway joints, and the primary object of the invention is to provide an exceedingly simple, inexpensive, durable and efficient device of this character.

Another object of the invention is to provide a rail joint embodying such characteristics that the joint may be made rigid and the parts positively locked against separation.

A still further object of the invention is to provide a device of this class which may be easily and quickly secured to the meeting ends of a pair of rails and which entirely dispenses with the employment of bolts and nuts or analogous unreliable securing devices.

A still further object of the invention is to provide a device of this character having means whereby the fish plates of a joint may be from time to time adjusted so as to force the same tightly against the webs of the rails.

With the above, and other objects in view, which will appear as the description progresses, the invention resides in the novel construction and combination of parts hereinafter fully described and claimed.

In the accompanying drawings there has been illustrated a simple and preferred embodiment of the improvement, and in which drawings, Figure 1 is a perspective view of a pair of rail ends connected by the improvement. Fig. 2 is a sectional view upon the line 2—2 of Fig. 1. Fig. 3 is a sectional view upon the line 3—3 of Fig. 2. Fig. 4 is a perspective view of one of the fish plates. Fig. 5 is a similar view of the opposite fish plate. Fig. 6 is a similar view of the locking bar. Fig. 7 is a similar view of one of the clamps.

In the accompanying drawings the numerals 1 designate the ends of a pair of rails, These rails 1 are constructed in the ordinary manner, being provided with a head 2, base flange 3 and connecting web 4. The webs 4 of the rails 1 adjacent their ends are provided with a plurality of rectangular openings, preferably four in number, and designated by the numeral 5.

The numeral 6 designates the fish plate secured upon the webs of one end of the rails. This fish plate 6 is provided with a plurality of rectangular openings 7, corresponding with the rectangular openings 5 of the rail webs.

The numeral 8 designates the fish plate adapted to engage the opposite sides of the webs of the rails. This fish plate 8 is provided with a plurality of rectangular openings 9, of a number corresponding with those provided by the webs of the rails and the opposite fish plates, and with which the said openings 9 are adapted to aline. The fish plate 8 is provided with a plurality of curved depressions 10, the same being arranged in parallel relation with each other, and with the edges of the plate 8.

The numeral 11 designates the locking bar. This bar or rod 11 is preferably rounded and has one of its faces provided with a plurality of offsets or lugs 12. These lugs 12 are arcuate and are adapted to be received within the rounded depressions or pockets 10 of the plate 8. The opposite side of the locking bar 11 is provided with a plurality of saddle members 13. These members 13 comprise a central rounded body portion 14 and a pair of sides or web members 15. The said saddle members 13 are preferably arranged between each pair of lugs or projections 12, and the locking bar upon the side of its face provided with the saddles 13 is further provided with a right angularly arranged rod or handle 16. The extremity of this handle is provided with a threaded opening 17, and the said opening is adapted for the reception of a headed adjusting screw 18.

The numeral 19 designates the clamping member. Each of these clamping members 19 is of a substantially similar construction and the indicating characters applied to one of the said clamps are equally applicable to the remaining clamps. The clamps 19 correspond in number with the rectangular openings in the rails and fish plates, and each of the clamps is provided with a body 20 from which projects a stem 21 formed at its extremity with a rectangular head 22. The head 22 has its sides of dimensions slightly less than the dimensions of the rectangular openings of the fish plates and rails, and upon inserting the clamp 19 the head 22 is first inserted through one of said openings, and the body 20 is then turned to bring the same to a vertical position, as clearly illustrated in Figs. 1, 2 and 3 of the drawings, thus allowing the enlargement or offset portions of the head to engage the sides of the fish plate 6 adjacent its openings 7. The body 20 of the clamps is preferably of a rectangular formation, and has its face adjacent its stem 21 of a length equaling the distance between the lower portions of the openings and the base flanges of the rails. The body 20 is further provided upon its upper face adjacent the stem 21 with a curved opening or cut away portion as indicated by the numeral 23, and the lower curved wall of this cut away portion is adapted to be received by the saddles 13 of the locking bar 11. The rod rests upon the tie 24, and the base flanges of the rails adjacent their meeting edges rest upon similar spaced ties 25. The tie 24 may be provided with a bearing plate 26, and the said bearing plate is adapted to receive the lower end of the adjusting screw 18, so that the locking bar 11 may be rotated to cause the cam members provided by the lugs 12, and the saddles 13 to adjust the fish plates 6 and 8 toward or away from the webs of the rails as desired.

From the above description, taken in connection with the accompanying drawings, the simplicity of the device as well as its advantages will be perfectly apparent to those skilled in the art to which the invention appertains, and while I have illustrated and described the preferred embodiment of the improvement, as it now appears to me, it is to be understood that the showing is merely illustrative, and that changes in the minor details of construction within the scope of the following claims may be resorted to if desired, as for instance, the adjusting screw 18 may be supplied with some suitable locking means whereby the adjustment of the locking bar cannot be interfered with.

Having thus fully described the invention, what I claim as new is:—

1. In combination with the meeting ends of a pair of rails, fish plates for the rails, one of said fish plates being provided with a plurality of depressions, a locking bar provided with cam offsets positioned within the depressions, a connection between the fish plates and the rails, said connection forming a seat for the locking bar, and means for adjustably rotating the locking bar.

2. The combination with the meeting ends of a pair of rails, a headed clamp member connecting the fish plates and the webs of the rails, one of said fish plates being provided with pockets, a locking bar rotatably mounted within the clamp members, said locking bar having one of its faces provided with a plurality of offset cam members adapted to engage within the pockets of the fish plate, said locking bar being provided with an offset rod, and an adjusting member carried by the rod.

3. In combination with the meeting ends of a pair of rails, said rails having their webs provided with rectangular openings, a pair of fish plates for the rails, said fish plates having their sides provided with a plurality of rectangular openings, clamping members, said clamping members comprising a body portion having a stem and a rectangular head, said head and stem adapted to be inserted within the openings of the fish plates and the rails and upon rotation to engage one of the fish plates, the body of the clamp being provided with a curved depression forming a pocket, a locking bar having offset saddle members engaging the pocket, said locking bar having its opposite face provided with cam offsets engaging one of the fish plates, means for rotating the locking bar, and means for sustaining the locking bar against rotation.

4. In combination with the meeting ends of a pair of rails, said rails having their webs provided with rectangular openings, fish plates for the sides of the rails, said fish plates being provided with alining rectangular openings, clamp members for the fish plates and the rails, said clamp members comprising a rectangular body portion and an offset stem, the end of the stem being provided with a rectangular head, the said head being of a size adapted, when the clamp is positioned in one direction, to pass through the openings within the fish plates and the webs and said heads being further adapted when the clamp is turned to a vertical position to engage the walls of the outer fish plate adjacent its opening, the clamp having its body portion adjacent its stem provided with a curved depression adapted to provide a pocket, the fish plate adjacent the clamp being provided with a plurality of depressions, a locking bar having one of its faces provided with a plurality of cam lugs, the locking bar having its opposite face provided with offset saddle members having side faces, the said saddle members adapted to engage with the pockets of the clamps, the locking bar being provided with an offset rod, the extremity of the rod having a threaded aperture, and a threaded headed member for the aperture, substantially as and for the purpose set forth.

In testimony whereof I affix my signature in presence of two witnesses.

WALTER GRZYBOWSKI.

Witnesses:
FRANK LEWANDOWSKI,
G. BONG.

Copies of this patent may be obtained for five cents each, by addressing the "Commissioner of Patents, Washington, D. C."